United States Patent [19]
Larrick, Jr. et al.

[11] Patent Number: 6,026,125
[45] Date of Patent: Feb. 15, 2000

[54] WAVEFORM ADAPTIVE ULTRA-WIDEBAND TRANSMITTER

[75] Inventors: J. Frederick Larrick, Jr., Silver Spring; Robert J. Fontana, Rockville, both of Md.

[73] Assignee: Multispectral Solutions, Inc., Gaithersburg, Md.

[21] Appl. No.: 08/857,836

[22] Filed: May 16, 1997

[51] Int. Cl.$^7$ .................................................. H04L 27/04
[52] U.S. Cl. ........................................ 375/295; 375/200
[58] Field of Search ................................ 375/295, 219, 375/202, 204, 200; 342/13, 27, 159, 375, 21, 28; 455/93, 91, 103; 324/642

[56] References Cited

U.S. PATENT DOCUMENTS

| | | | |
|---|---|---|---|
| 3,500,404 | 3/1970 | Aderson et al. | 343/17.1 |
| 3,612,899 | 10/1971 | Ross et al. | 307/96 |
| 3,662,316 | 5/1972 | Robbins | 375/256 |
| 3,728,632 | 4/1973 | Ross | 375/256 |
| 3,983,422 | 9/1976 | Nicolson et al. | 327/195 |
| 4,152,701 | 5/1979 | Mara et al. | 342/21 |
| 4,427,982 | 1/1984 | Caprio | 342/159 |
| 4,641,317 | 2/1987 | Fullerton | 375/200 |
| 4,688,041 | 8/1987 | Cronson et al. | 342/17 |
| 4,695,752 | 9/1987 | Ross et al. | 327/18 |
| 4,743,906 | 5/1988 | Fullerton | 342/27 |
| 4,813,057 | 3/1989 | Fullerton | 375/259 |
| 4,979,186 | 12/1990 | Fullerton | 375/239 |
| 5,146,616 | 9/1992 | Tang et al. | 455/103 |
| 5,216,695 | 6/1993 | Ross et al. | 375/295 |
| 5,239,309 | 8/1993 | Tang et al. | 342/13 |
| 5,274,271 | 12/1993 | McEwan | 307/108 |
| 5,307,079 | 4/1994 | Ross et al. | 343/822 |
| 5,337,054 | 8/1994 | Ross et al. | 342/93 |
| 5,345,471 | 9/1994 | McEwan | 375/200 |
| 5,361,070 | 11/1994 | McEwan | 342/21 |
| 5,363,108 | 11/1994 | Fullerton | 342/27 |
| 5,471,162 | 11/1995 | McEwan | 327/92 |
| 5,479,120 | 12/1995 | McEwan | 327/91 |
| 5,510,800 | 4/1996 | McEwan | 342/387 |
| 5,512,834 | 4/1996 | McEwan | 324/642 |
| 5,519,400 | 5/1996 | McEwan | 342/28 |
| 5,521,600 | 5/1996 | McEwan | 342/27 |
| 5,523,760 | 6/1996 | McEwan | 342/89 |
| 5,563,605 | 10/1996 | McEwan | 342/202 |
| 5,573,012 | 11/1996 | McEwan | 600/595 |
| 5,581,256 | 12/1996 | McEwan | 342/27 |

*Primary Examiner*—Stephen Chin
*Assistant Examiner*—Chieh M. Fan
*Attorney, Agent, or Firm*—Kile McIntyre & Harbin

[57] ABSTRACT

A waveform adaptive transmitter that conditions and/or modulates the phase, frequency, bandwidth, amplitude and/or attenuation of ultra-wideband (UWB) pulses. The transmitter confines or band-limits UWB signals within spectral limits for use in communication, positioning, and/or radar applications. One embodiment comprises a low-level UWB source (e.g., an impulse generator or time-gated oscillator (fixed or voltage-controlled)), a waveform adapter (e.g., digital or analog filter, pulse shaper, and/or voltage variable attenuator), a power amplifier, and an antenna to radiate a band-limited and/or modulated UWB or wideband signals. In a special case where the oscillator has zero frequency and outputs a DC bias, a low-level impulse generator impulse-excites a bandpass filter to produce an UWB signal having an adjustable center frequency and desired bandwidth based on a characteristic of the filter. In another embodiment, a low-level impulse signal is approximated by a time-gated continuous-wave oscillator to produce an extremely wide bandwidth pulse with deterministic center frequency and bandwidth characteristics. The UWB signal may be modulated to carry multi-megabit per second digital data, or may be used in object detection or for ranging applications. Activation of the power amplifier may be time-gated in cadence with the UWB source thereby to reduce inter-pulse power consumption. The UWB transmitter is capable of extremely high pulse repetition frequencies (PRFs) and data rates in the hundreds of megabits per second or more, frequency agility on a pulse-to-pulse basis allowing frequency hopping if desired, and extensibility from below HF to millimeter wave frequencies.

34 Claims, 9 Drawing Sheets

WAVEFORM ADAPTIVE ULTRA-WIDEBAND TRANSMITTER

BACKGROUND OF THE INVENTION

1. Field of the Invention

This invention relates to the field of ultra-wideband communication systems. More particularly, it relates to the controlled transmission of ultra-wideband electromagnetic pulses.

2. Background of Related Art

Ultra-wideband (UWB) systems, both for radar and communications applications, have historically utilized impulse, or shock-excited, transmitter techniques in which an ultra-short duration pulse (typically tens of picoseconds to a few nanoseconds in duration) is directly applied to an antenna which then radiates its characteristic impulse response. For this reason, UWB systems have often been referred to as "impulse" radar or communications. In addition, since the excitation pulse is not a modulated or filtered waveform, such systems have also been termed "carrier-free" in that no apparent carrier frequency is evident from the resulting RF spectrum.

To be useful for data communications, previous UWB impulse or carrier-free transmission systems have been limited to ON-OFF keying (binary amplitude shift keying ASK) or pulse position modulation (PPM) since amplitude and/or phase control of the waveform was extremely difficult or impossible to implement. In addition, these previous systems have been fixed bandwidth and fixed frequency with no capability for frequency hopping or dynamic bandwidth control.

Output power and pulse repetition frequency (PRF) of UWB impulse transmitters have also been limited due to fundamental physical limitations of the devices used to generate the ultra-short duration pulses. In particular, high output power and high PRF were mutually exclusive properties of such systems. High output power impulse excitation sources such as bulk avalanche semiconductors, high voltage breakover devices, high voltage Gallium Arsenide (GaAs) thyristors, plasma diodes, stacked arrays of step recovery diodes (SRDs), etc. required hundreds to many thousands of volts for proper operation and, consequently, were limited to PRFs below a few tens of kilohertz due to increased device heating and thermal breakdown at higher PRFs. Lower power devices, such as avalanche transistors, low voltage SRDs, Zener diodes, etc., can operate at PRFs of several megahertz, but produced output powers many orders of magnitude lower. In addition, while the individual devices were typically low cost, they often needed to be hand-selected in order to guarantee avalanche or breakdown characteristics at a particular operating voltage level.

As an example, early versions of UWB impulse transmitters typically generated less than one watt peak microwave output power at a maximum PRF of approximately 10 kHz using baseband impulse excitation powers of tens to several thousand watts. Several laboratory models using these high voltage sources were constructed for radar applications which included ship docking, pre-collision sensing for automobiles, liquid level sensing, and intrusion detection. Although these techniques proved to be reliable, the power efficiency, PRF limitations, size and complicated antenna assemblies limited performance and reproducibility.

Another significant limitation of such impulse-based UWB sources is the fact that the power level decreases with increasing frequency at a rate of approximately 12 dB per octave. This is due to the double exponential nature of the impulse excitation. The output response from a typical impulse source has the form:

$$p(t) = \frac{t}{\alpha} e^{(1-\frac{t}{\alpha})} u_{-1}(t)$$

where $\alpha$ is the pulse rise time and $u_{-1}(t)$ is the unit step function. FIG. 10 shows the output response $p(t)$ versus time. This waveform closely approximates the output seen from the vast majority of impulse sources.

One can now compute the instantaneous pulse power versus frequency (magnitude-squared Fourier transform) as:

$$P(f) = \frac{e^2}{16\pi^4} \frac{1}{\alpha^2 f^4}$$

Note that if the rise time is doubled, the power at any given frequency decreases by 6 dB. Similarly, for a constant peak voltage source, doubling the frequency of operation decreases the output power by 12 dB.

As an example, a 2.5 kW peak power output thyristor-based impulse generator develops only about 1 watt peak power at L-Band (1.5 GHz range) since the vast majority of the impulse energy is produced at significantly lower frequencies. This unused energy is dissipated as heat, subjecting operating circuits to overheating and damage, and limiting the PRF or data rate at which the source can operate reliably. The upper trace in FIG. 11 shows the rapid drop in available power versus frequency from a conventional thyristor-based impulse source.

Another limitation in the use of such techniques is the lack of accurate control of radiated emissions to meet regulatory requirements. Since a short pulse excitation will stimulate the impulse response of an antenna, and a typical wideband antenna has a frequency response extending over many octaves in frequency (an octave of frequency being a doubling of frequency), the radiated spectrum will be extremely broadband, covering hundreds of megahertz (MHz) to several gigahertz (GHz) or more of instantaneous bandwidth. This broad spectrum may overlap many frequencies of operation licensed otherwise by the U.S. Federal Communications Commission (FCC) in the U.S. or by other means in foreign countries, thus presenting a concern to operators or users of allocated frequencies, albeit at very low average power levels.

Thus, conventional UWB signal generation techniques suffer from several shortcomings:

(i) high power operation can only be achieved at reduced PRFs because of device heating;

(ii) practical operational frequencies are limited to well below 5 GHz due to the 12 dB per octave falloff of output impulse energy with increased frequency;

(iii) impulse excitation of an antenna results in a "carrier-free" signal which would uncontrollably overlap frequencies restricted from such use, albeit with low energy densities; and (iv) modulation techniques are limited to on-off keying and pulse position modulation, with no capability for frequency hopping or for dynamic bandwidth control.

There is a need to achieve a higher output power for long distance communications and for small target detection in the case of a radar system, to develop high PRFs for the transmission of wideband video and data, to produce UWB transmissions at well-controlled center frequencies and bandwidths extending to higher operating frequencies (e.g., millimeter wave), and to allow for newer and more efficient modulation techniques.

SUMMARY OF THE INVENTION

The present invention provides a breakthrough in UWB communications in that it generates a waveform adaptive or carrier-controlled UWB signal having a controlled center frequency and an adjustable bandwidth. These adjustments can be performed on a pulse-by-pulse basis, allowing for UWB frequency hopping and adaptive bandwidth control.

One preferred embodiment distinctively utilizes a low-level impulse-gated oscillator to produce an extremely wide bandwidth pulse which can operate at extremely high pulse repetition frequencies (FIG. 1). Precise control of radiated frequency is governed by the choice of oscillator which has a known stable frequency. The oscillator can be fixed frequency or a voltage controlled oscillator (VCO), the latter in particular for UWB frequency hopping applications. Oscillator phase may also be controlled to generate an additional phase modulation. With suitable choice of oscillator and mixer, UWB signals can be generated with center frequencies from near DC to millimeter wave frequencies. Signal bandwidth is governed by a bandpass or pulse shaping filter which, when used to drive a wideband mixer, controls the spectral characteristics of the output waveform. An output bandpass filter further limits out of band energy; and a gated power amplifier is used to amplify the UWB signal to the desired peak power output level.

Another embodiment distinctively utilizes a low-level impulse generator and bandpass or pulse shaping filter without need for a separate oscillator and mixer (FIG. 2). This embodiment is particularly useful for non-agile operation at frequencies below 5 GHz for which sufficient impulse energy can be generated to drive an additional gated power amplifier. This approach is mathematically equivalent to that of FIG. 1 when the oscillator frequency is chosen to be precisely zero. In this case, UWB signal center frequency and bandwidth are directly determined by the characteristics of the bandpass or pulse shaping filter.

Another variant of the impulse-gated oscillator is derived through the use of analog or digital time-gating (FIG. 3). In this embodiment, the low-level impulse excitation is approximated by the response of a set of high-speed switches (FIG. 4). These switches gate the oscillator output ON for a very short time period (FIG. 5). Such time-gating may also be achieved through the use of analog or digital pulse shaping circuitry (FIG. 6).

VCOs in the L-band (1.5 GHz) and in the X-band (10 GHz) region were implemented in exemplary embodiments of the present invention, although it is equally possible that oscillators of other types and of other frequencies can be used. Unlike conventional impulse or "carrier-free" techniques, one aspect of the present invention provides an UWB signal having a well-defined, controllable carrier frequency and bandwidth with the additional capability for independent phase and amplitude modulation.

Each of these UWB transmitters can operate at extremely high data rates, enabling the transmission of high speed data such as real-time digitized video, multiple simultaneous digital voice channels, or other information, as well as the transmission of high PRF pulse trains for radar or ranging applications.

To achieve high power output from any of these UWB sources, a gated power amplifier is used (FIG. 8). The gated power amplifier has the unique feature of high power efficiency as the power amplifier is only turned on for approximately the duration of the UWB pulse.

It is an object of the present invention to provide a frequency and bandwidth adaptive UWB transmitter.

It is a further object to provide an UWB transmitter having controllable spectral features superior to those provided by conventional impulse and "shock-excited" UWB signal generating transmitters.

It is a further object to provide an UWB transmitter system that obviates pulse repetition frequency (PRF) limitations of conventional systems, thus allowing extremely high data rates on the order of hundreds of megabits per second.

It is yet another object of the present invention to provide an UWB transmitter having frequency extensibility to millimeter wave frequencies by suitable selection of an RF carrier and impulse- or time-gating characteristics.

It is an additional object to provide an UWB transmitter having digital amplitude and/or phase control to permit the generation of M-ary communications waveforms such as ultra-wideband quadrature amplitude modulation (QAM), quadrature phase shift keying (QPSK), etc.

It is a further object to provide an UWB transmitter having frequency agility (e.g., frequency hopping) through direct digital control (DDC) of the RF oscillator center frequency.

It is another object to provide an UWB transmitter having pulse width agility, and thus bandwidth agility, through the use of direct digital control of the time-gating circuitry parameters.

It is also an object to provide an UWB transmitter having 50 Ω impedance matching for ease of fabrication into stripline or microstrip hybrid or multi-chip module (MCM) circuits.

It is another object to provide an UWB transmitter permitting the use of wideband Monolithic Microwave Integrated Circuit (MMIC) power amplifiers to deliver an efficient, significant and accurately controllable amount of transmitter power to an antenna.

It is yet another object to provide an UWB transmitter with a gated power amplifier that achieves high power efficiency because it draws minimal current except during that brief period of time in which the UWB pulse is being generated. Because of the extremely low duty cycle of an UWB waveform, even at high PRFs, the gated power amplifier is important to the UWB transmitter in designs requiring low power consumption such as battery-operated handheld radios, unattended sensors, etc.

These and other objects of the invention will become more readily apparent upon review of the following description. The invention, though, is pointed out with particularity by the appended claims.

BRIEF DESCRIPTION OF THE DRAWINGS

The invention will be described with reference to the drawings, in which.

DETAILED DESCRIPTION OF ILLUSTRATIVE EMBODIMENTS

Without limitation of the invention, two classes of UWB transmitters which generate UWB signals having controllable spectral characteristics according to the present invention will be described. The first class of UWB transmitters include an impulse-gated oscillator (and the special case in which the oscillator frequency is precisely zero), and the second class includes a time-gated oscillator in which time-gating circuitry approximates the response of a low-level impulse.

Figure 1:
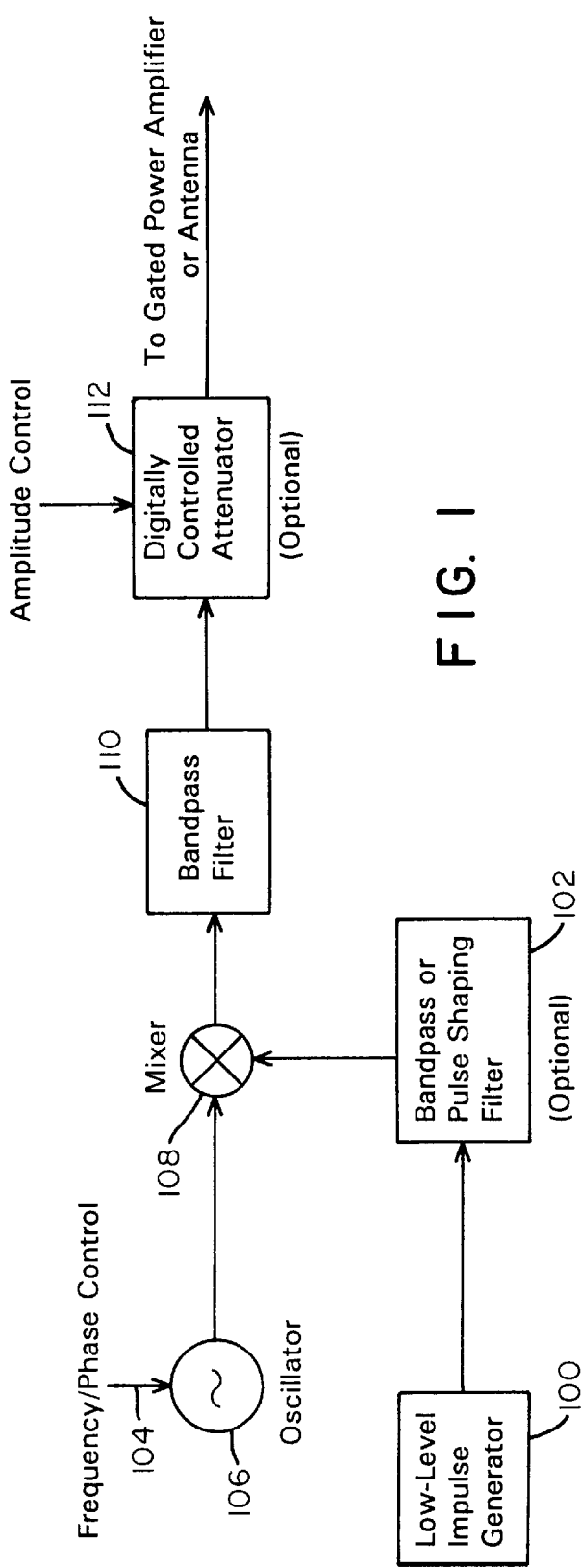
FIG. 1 shows a first embodiment of the present invention in which an UWB transmitter utilizes an impulse-gated oscillator.

Microwave components of the present invention may be built to operate into 50 ohms to obtain maximum power transfer, to make use of readily available radio frequency (RF) components, and to provide a readily manufacturable design using conventional microstrip or stripline circuitry.
Class I: Impulse-gated Oscillator (IGO) UWB transmitters FIG. 1 shows an UWB transmitter in which a low-level impulse is used to gate an oscillator to produce an UWB output.

Low-level impulse generator 100 excites an optional bandpass or pulse shaping filter 102 with a low-level impulse. Low-level impulse generator 100 can comprise any number of possible devices, including low voltage SRDs, Zener diodes, avalanche transistors, break over devices (BODs), thyristors, etc. One particular embodiment utilized an SRD, part no. MA44768-287 commercially available from M/A-COM, together with driving electronics.

If filter 102 is not utilized, the low-level impulse is used to directly gate oscillator 106 by switching mixer 108 to alternately pass or not pass the oscillator output to the input of bandpass filter 110. The particular microwave mixer 108 used for the L-band, 1.5 GHz implementation is commercially available from Mini-Circuits Lab, part no. RMS-25MH. For proper operation, adequate ON/OFF isolation between output UWB signal pulse and gating signal can be achieved through the use of multiple mixers. Approximately 40 to 60 dB isolation is believed to provide adequate security.

The amplitude of the low-level impulse generator 100 can be adjusted to change the pulse width, and hence the instantaneous bandwidth, of the UWB signal at the output of mixer 108. By increasing the amplitude, a larger time exists in which the oscillator signal appears at the output of mixer 108 (wider pulse width) because of the increased time during which the mixer diodes are forward biased. Conversely, the lower the amplitude of the low-level impulse generator output, the shorter the time in which the oscillator signal appears at the output of mixer 108 (shorter pulse width). The bandwidth of the resultant UWB signal can be varied on a pulse-by-pulse basis by digitally controlling the amplitude of the low-level impulse generator output into the mixer.

Thus, mixer 108, in effect, acts as a high speed switch which amplitude modulates the signal output from oscillator 106 with impulse excitation from low-level impulse generator 100. The resultant pulse envelope preserves the original time domain shape of the impulse excitation. Only a few milliwatts of peak power are needed to drive the mixer diodes of the mixer 108 into saturation, and thus low voltage impulse sources can be utilized with the advantage that extremely high speed (hundreds of megabits per second) UWB signaling can be achieved.

If filter 102 is utilized, the mixer acts to heterodyne the bandpass-filtered or pulse shaped low-level impulse signal to the desired operating center frequency. The bandwidth of the UWB signal at the output of mixer 108 is then determined by the bandwidth of the bandpass or pulse shaping filter 102. Using this approach, low-level impulse generator 100 can be operated at a lower frequency, with the broadband energy shifted in frequency to the desired range.

The center frequency, as well as the instantaneous phase, of the UWB signal can be controlled via oscillator control 104. This allows for frequency agile UWB emissions by simply changing the frequency of the oscillator 106 according to a desired hopping pattern. In addition, the instantaneous phase of the UWB pulse can be changed on a pulse-by-pulse basis to allow for various forms of phase modulation.

A pulse-to-pulse coherent waveform can be generated by phase-locking the low-level impulse generator 100 to the oscillator 106. A digitally controlled RF attenuator 112 can be used to allow for additional amplitude modulation. The combination of phase, frequency and amplitude modulations enable the generation of a wide class of UWB waveforms including UWB quadrature amplitude modulation (UWB-QAM), UWB M-ary phase modulation (UWB-PSK), etc. Bandpass filter 110 is used to reject undesirable, or out-of-band, frequencies and/or mixer products prior to gated power amplification and eventual transmission.

The transmitted UWB waveform is not "carrier free" as in conventional UWB systems but instead includes a well-defined and controllable center or carrier frequency established by the frequency of the oscillator 106.

Figure 2:
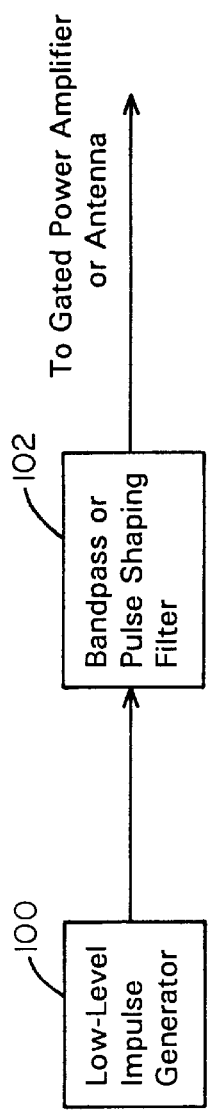
FIG. 2 shows a second embodiment of an UWB transmitter of the present invention in which a low-level impulse generator directly excites a bandpass or pulse shaping filter, without the use of an oscillator or mixer, prior to gated power amplification. This circuit is equivalent to that of FIG. 1 with a zero frequency oscillator (i.e., DC bias on the mixer).

FIG. 2 shows an UWB transmitter in which a low-level impulse generator 100 is used to impulse-excite a bandpass or pulse shaping filter 102. FIG. 2 is a special case of FIG. 1 in which the frequency of oscillator 106 is set to precisely zero. That is, the oscillator of FIG. 1 is replaced by a DC source which serves to always turn ON mixer 108 regardless of the amplitude of the low-level impulse generator. Unlike FIG. 1, the circuitry of FIG. 2 does not easily permit frequency hopping or phase modulation. However, its advantages are that, for center frequencies up to about 5 GHz, the circuit is simple and inexpensive to implement; and, like FIG. 1, allows for high speed operation (because of the use of a high speed low-level impulse source) with controllable spectral filtering and shaping.

Figure 12A:
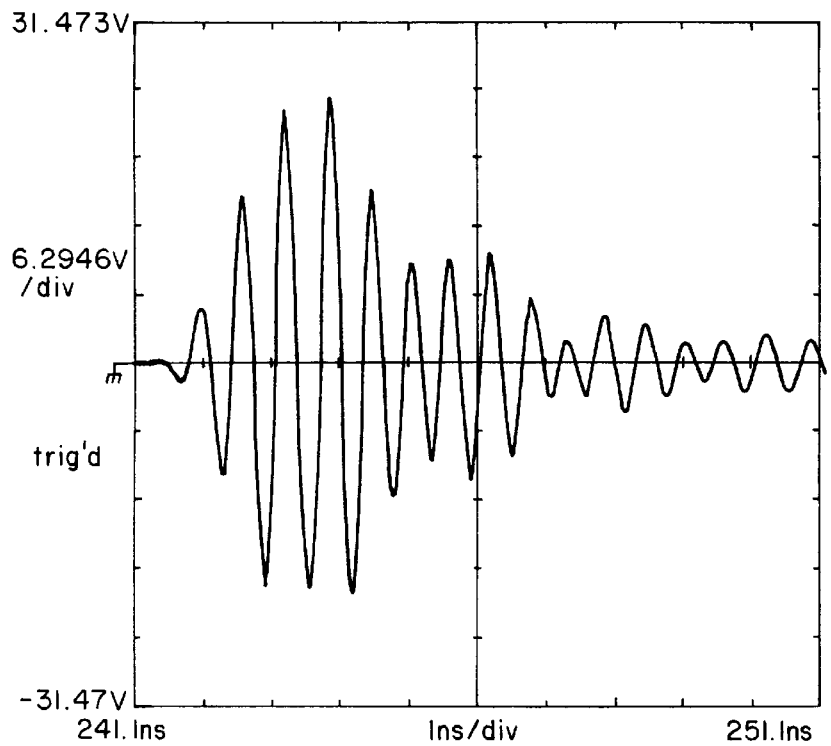
FIG. 12A shows an actual transmitted UWB signal generated by an UWB transmitter using a low-level impulse generator and a microwave bandpass filter, generating an L-band UWB signal at a center frequency of 1.5 GHz with a 3 dB down bandwidth of 400 MHz.
Figure 12B:
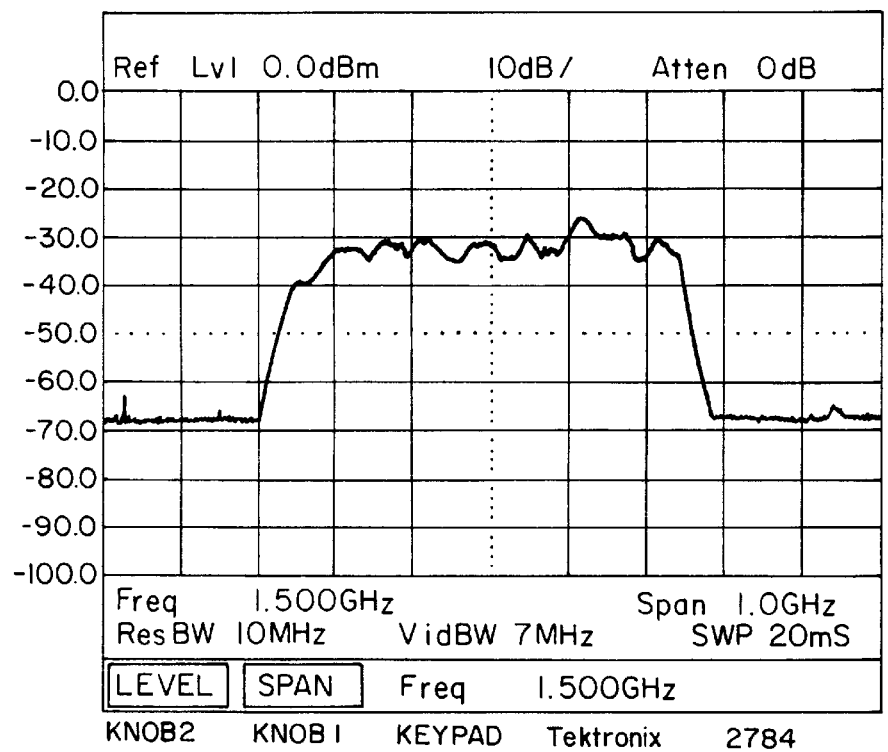
FIG. 12B shows the frequency spectrum of the UWB signal shown in FIG. 12A.

An UWB transmitter using a low-level impulse generator and microwave bandpass filter was constructed which generated an L-band UWB signal at a center frequency of 1.5 GHz, with a 3 dB down bandwidth of 400 MHz. FIG. 12A shows the actual transmitted UWB signal generated by this method. FIG. 12B shows the frequency spectrum of the UWB signal shown in FIG. 12A. The particular filters used were L-band bandpass filters, with a center frequency of 1.5 GHz, a 1 dB bandwidth of 400 MHz, a 3 dB bandwidth of 500 MHz, rejection at 1 GHz of greater than 30 dB down, and rejection at 1.9 GHz of greater than 30 dB down.

Theoretically, to understand how the circuit shown in FIG. 2 provides an UWB signal which includes an apparent carrier, we refer to Carlson, A. Bruce "Communication Systems, An Introduction to Signals and Noise in Electrical Communication", McGraw-Hill, New York, chap. 5.1 (1975), the contents of which are explicitly incorporated herein by reference. According to Carlson, the impulse response $h_{BP}$(t) of a bandpass filter can be written in quadrature carrier form as follows:

$$h_{BP}(t) = 2\text{Re}[h_{LP}(t)e^{j\omega_c t}]$$

where Re denotes the real part, $h_{LP}$(t) is the impulse response of the low pass equivalent of $h_{BP}$(t), and $\omega_C$ is the center frequency of the bandpass filter. Thus, impulse excitation of bandpass filter 102 is equivalent to heterodyning a low pass spectrum of shape $H_{LP}$(f) to a center frequency of $\omega_C$. The resultant signal can be extremely broadband, depending only upon the selected characteristic shape and bandwidth of bandpass filter 102. Moreover, the signal is not carrier-free in the conventional sense as the apparent carrier frequency is determined by bandpass filter 102. Also, unlike direct high-power impulse excitation of an antenna as in conventional UWB transmitters, low-level impulse excitation of bandpass filter 102 provides complete control over all aspects of the spectral emissions of the UWB transmitter. This is because the spectral emissions are determined exactly by the characteristics of bandpass filter 102, for instance by the center frequency, bandwidth, out of band rejection and skirt responses.

Figure 8:
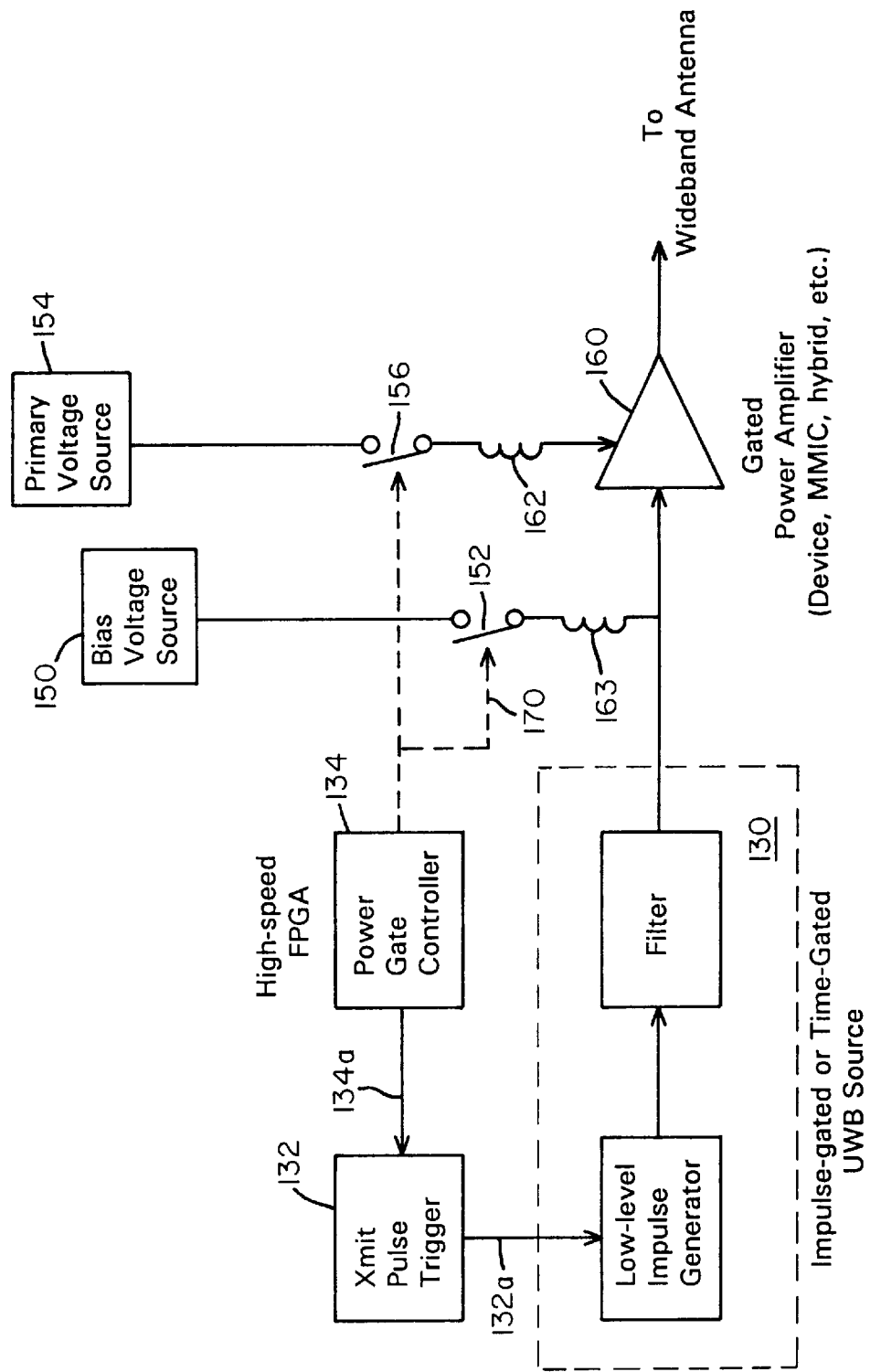
FIG. 8 shows an embodiment of an impulse-gated UWB transmitter utilizing both a microwave oscillator and a low-level impulse generator.

To achieve the desired output power level, a gated power amplifier circuit (FIG. 8) is used. The gating of gated power amplifier 160 is equally applicable to all embodiments of the present invention. In FIG. 8, the output of an impulse-gated or time-gated UWB source 130 is fed to a MMIC amplifier chain of amplifier 160. Any suitable RF amplifiers may be implemented instead of the MMIC amplifiers. The particular MMIC amplifiers used are commercially available from STANFORD MICRODEVICES, part no. SNA-586, operable from DC to 8 GHz. Other amplifiers may be selected for frequencies ranging from HF to millimeter wave.

A power gate controller 134 with transmit pulse logic is formed by a suitably programmed high-speed field programmable gate array (FPGA) or programmable logic device (PLD). The power gate controller 134 generates appropriate timing signals for triggering the low level impulse generator through transmit pulse trigger 132, and for applying voltages as necessary (either bias, primary or both) to the gated power amplifier 160. The impulse-gated or time-gated UWB generator 130 provides a low-level UWB signal to gated power amplifier 160 via an MMIC amplifier chain.

Switches 152, 156, e.g. high speed power bipolar or FET switches, control the application of the bias voltage from the bias voltage source 150 and the primary voltage from the primary voltage source 154, respectively, to gated power amplifier 160. The particular gating switches 152, 156 used were power FETs, part no. IRF7304, commercially available from TEXAS INSTRUMENTS. RF chokes 162, 163 may need to be inserted between gating switches 152, 156 and gated power amplifier 160, depending upon the particular RF power devices used, to prevent RF feedback to the DC supplies.

In the gated power amplifier 160, the total capacitance in the DC power bypassing circuitry was minimized, as the RC time constant of the primary voltage source 154, determined by the source impedance and coupling capacitance, dictates the rate at which the UWB transmitter can reach its full operating power output. Only extremely fast turn-on, low impedance switches (e.g., GaAs MMIC switches) were used, and timing accuracies as shown in FIG. 9 were maintained to nanosecond resolution for optimal efficiency.

Figure 9:
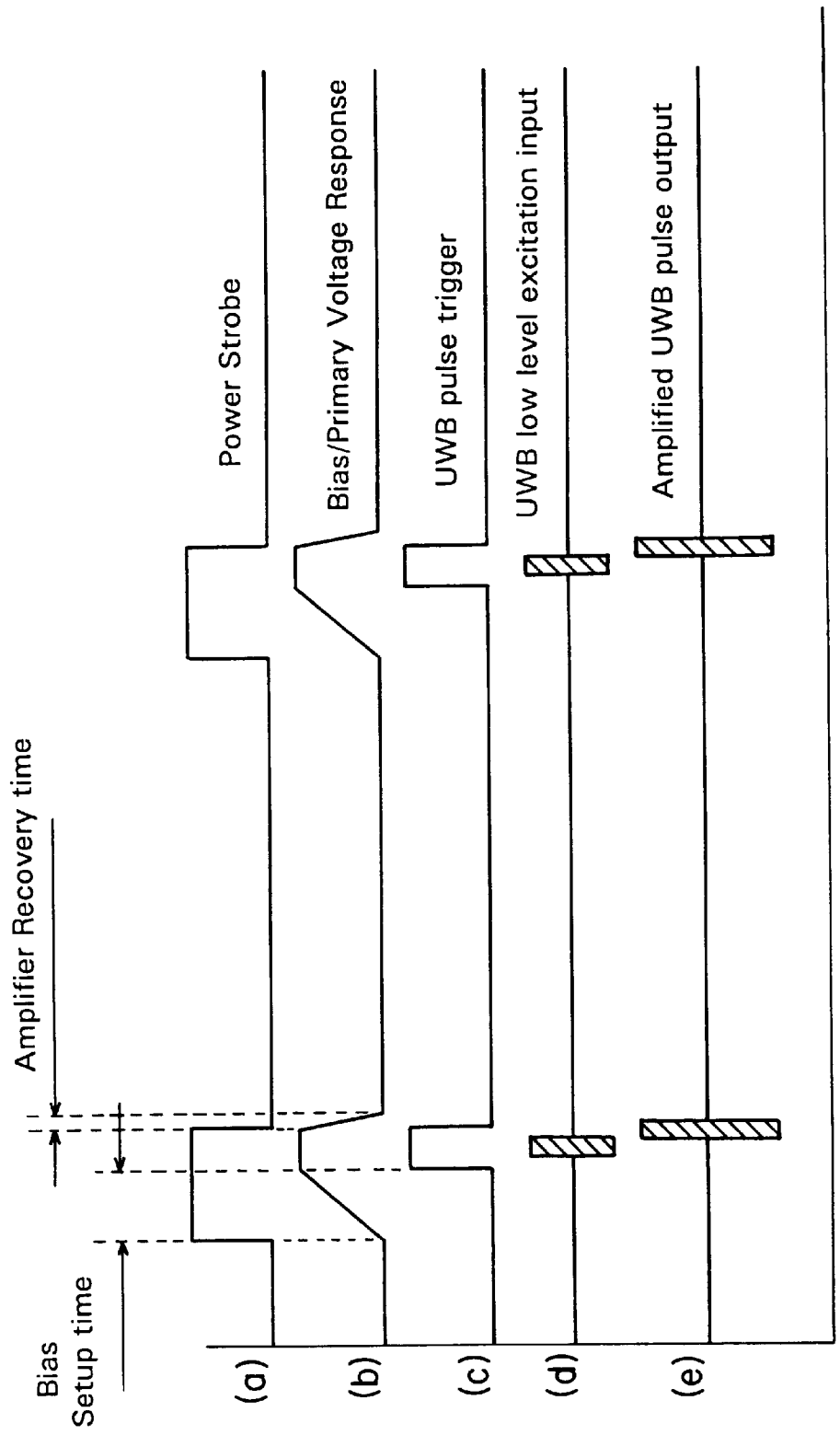
FIG. 9 shows a timing diagram for the circuit shown in FIG. 8.
Figure 10:
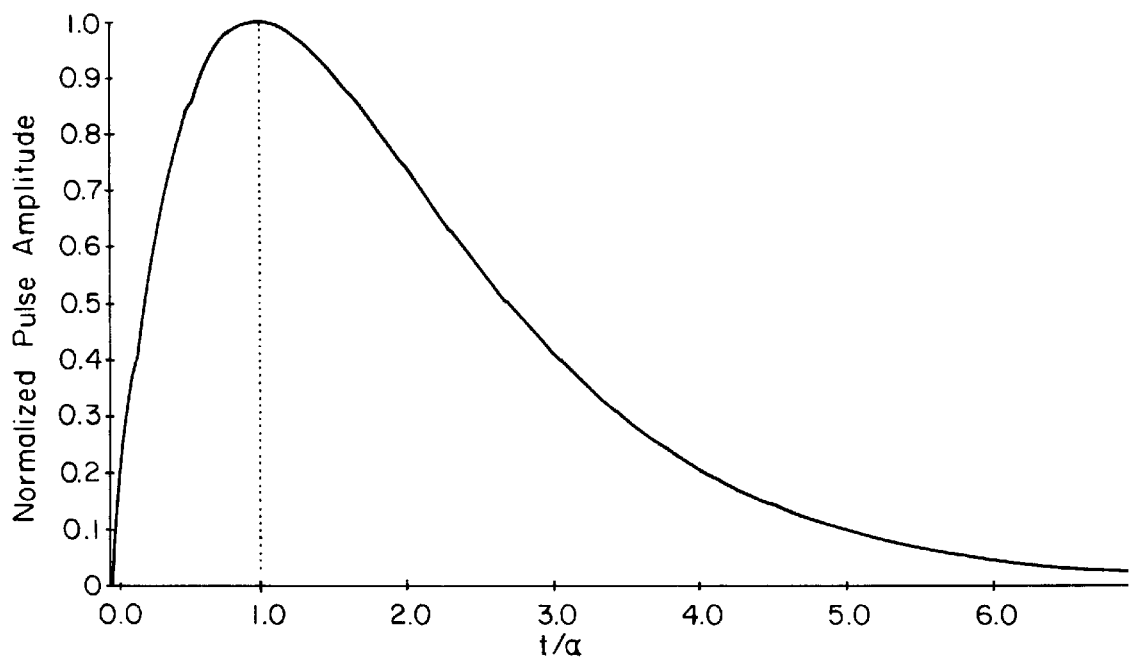
FIG. 10 shows a normalized plot of UWB signal pulse amplitude of a conventional impulse source versus time.
Figure 11:
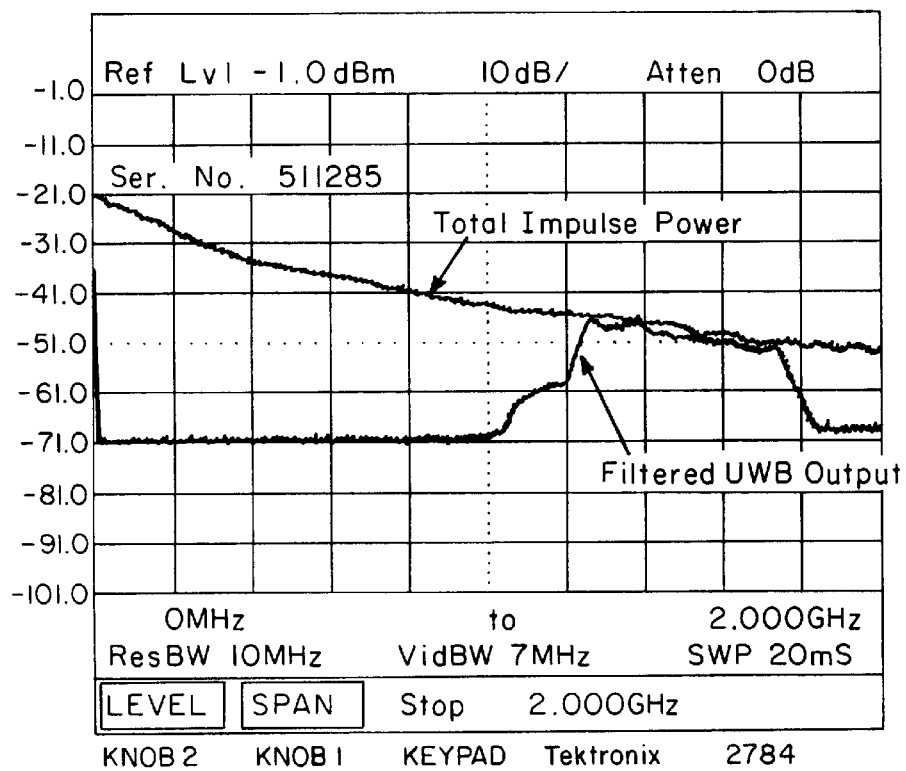
FIG. 11 shows the power spectrum of an impulse UWB signal, superimposed with a filter signal in the L-band, for explaining the small amount of power of an impulse signal in the L-band.

FIG. 9 shows the timing diagram for gated power amplifier 160. In waveform (a), a power strobe signal 134a (FIG. 8) is output from power gate controller 134 in advance of the transmit pulse trigger so that the DC operating parameters of the gated power amplifier 160 stabilize prior to application of the UWB pulse. Since the UWB signal pulse is of extremely short duration (i.e., of only a few nanoseconds or sub-nanoseconds), it is only necessary to bias gated power amplifier 160 ON during the time that the UWB signal pulse presents itself to the input terminals of gated power amplifier 160, plus the additional time necessary for the UWB signal pulse to propagate through gated power amplifier 160. Additionally, because of stray capacitance and RC time constants related to bias supply resistance and coupling capacitors, it takes an additional finite amount of time, once bias is switched ON, for gated power amplifier 160 to reach its active region. The trigger signal 132a (FIG. 8) output from the transmit pulse trigger 132 is therefore delayed by at least the bias setup time shown in waveform (a) of FIG. 9, allowing the UWB low-level excitation from low-level UWB source 130 to be output only after gated power amplifier 160 reaches the point at which it can produce a full power output, i.e., at point 200.

The power strobe signal shown in waveform (a) of FIG. 9 is removed at point 202, thereby removing the DC power bias conditions applied to gated power amplifier 160 by bias voltage source 150 and primary voltage source 154 only after the UWB signal pulse has propagated through gated power amplifier 160 (typically the width of the UWB signal pulse plus a latency time due to propagation effects within the gated power amplifier 160). The bias in gated power amplifier 160 thereafter decays to a state which removes gated power amplifier 160 from its active, high-power drain region.

Since UWB signals, as generated above, are of extremely short duration (e.g., typically a few hundred picoseconds to a few nanoseconds), it is necessary that the full power bandwidth of gated power amplifier 160 be wide enough to pass the pulses of the UWB signal without excessive distortion. Thus, the full power bandwidth of the gated power amplifier 160 should be approximately equal to the reciprocal of the pulse width of the UWB signal. For instance, for a one nanosecond UWB signal pulse, the full power bandwidth of the gated power amplifier 160 should be at least 1 GHz.

In addition, for optimum power efficiency, the width of the power strobe signal should only be wide enough to enable gated power amplifier 160 to reach steady state and pass the UWB signal pulse without shutting down prematurely. A power strobe width larger than this will increase the amount of power dissipated by the gated power amplifier 160 and thus increase the power consumed by the UWB transmitter.

A high-efficiency power amplifier enhances the ability to implement the UWB transmitter according to the present invention in a portable device. Although the power amplifier 160 need not be gated, the gating of power to the gated power amplifier 160 provides significant power reduction which is particularly useful for battery operated UWB applications in which primary power consumption is a major concern, e.g., hand-held UWB transceivers, battery operated UWB radar sensors, etc.

Class II: Time-gated Oscillator (TGO) UWB transmitters

The basis for this class of UWB transmitters is the time-gating of a microwave oscillator with a control signal of short duration to obtain an UWB signal with selected spectral characteristics. This time gating can be accomplished either by utilizing fast-acting switches, or by switching the microwave signal ON/OFF with a low-level analog or digital signal which approximates an impulse.

Figure 3:
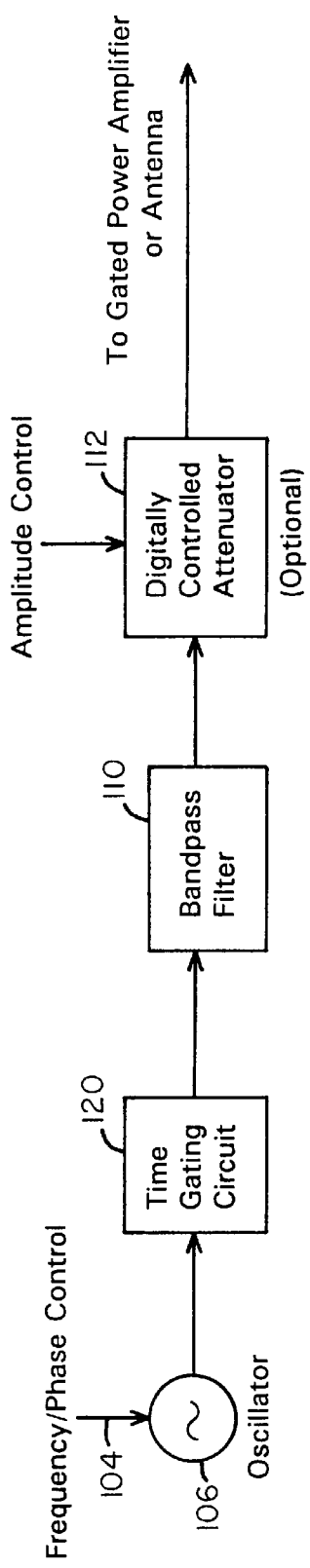
FIG. 3 is a block diagram of another embodiment of the present invention showing an UWB transmitter utilizing time gating circuitry which approximates the response of a low-level impulse.

FIG. 3 shows an UWB transmitter utilizing a time-gated oscillator source. Time gating circuit 120 controllably gates the output of microwave oscillator 106 to provide an UWB signal. The signal is subsequently filtered by bandpass filter 110 to remove out-of-band energy. The power level of the transmitted UWB signal is controlled by an optional digitally controlled attenuator 112, and the resultant signal is subsequently power-amplified for transmission by a gated power amplifier. If digitally controlled attenuator 112 is not used, the UWB signal is fed directly to the gated power amplifier.

Oscillator 106 can be either a fixed frequency or a voltage controlled oscillator (VCO), the latter allowing the center frequency of the UWB source to be changed as desired or on a pulse-by-pulse basis. The particular oscillator used in the L-band embodiment is a 1.5 GHz VCO commercially available from Z-COMM, part no. V602MC01. The microwave oscillator 106 does not need to be very stable particularly when, as in this application, non-coherent communication techniques are utilized. The frequency and/or phase of microwave oscillator 106 can be controlled by signals on frequency/phase control line 104. In this way, the phase component of a modulation scheme can be injected into the UWB signal before transmission. Frequency hopping, which is not possible in prior art UWB transmitters, can be implemented by actively controlling the frequency of oscillator 106.

Accurate control of output power is implemented by digitally controlled attenuator 112 having a 50 ohm impedance providing efficient and predictable power transfer. The particular digitally controlled attenuator 112 used in this embodiment is commercially available from M/A-COM, part no. AT-230.

Time gating circuit 120 gates a continuous wave (CW) phase and/or frequency-controlled signal from oscillator 106 in a tightly controlled manner. Oscillator 106 and time gating circuit 120 form a UWB signal source. Unlike conventional systems, the UWB transmitter according to the present invention does not directly excite an antenna with a high-power impulse signal. Rather, a time-gated UWB source provides well defined output spectral characteristics which can be adjusted as desired to avoid off-limit frequencies.

As described above, a gated power amplifier amplifies the time-gated UWB signal for presentation and radiation from a wideband antenna. To reduce the overall power needs of the UWB transmitter, the power applied to the gated power amplifier may be gated in synchronization with the gating of oscillator 106 performed by time gating circuit 120. Power is applied to the gated power amplifier only during the gated time of the time-gated oscillator UWB source, plus any required ramp-up and latency period. Thus, the gated power amplifier is powered ON a predetermined amount of time prior to the arrival of the UWB pulse (e.g., a few nanoseconds prior to the pulse arrival), and is powered OFF after the UWB signal pulse has passed through. In this fashion, minimal DC power is required to generate the high-power UWB signal. The particular power amplifier used in this embodiment is commercially available from STANFORD MICRODEVICES, part no. SMM-280-4.

The transmitted UWB waveform is not "carrier free" as in conventional systems but instead includes a well-defined and controllable center or carrier frequency established by the frequency of oscillator 106. Moreover, the pulse width of the time gating in time gating circuit 120 controls the instantaneous bandwidth of the radiated UWB signal. Adjustment of the pulse width of time gating circuit 120 correspondingly adjusts the instantaneous bandwidth of the transmitted UWB signal.

Figure 4:
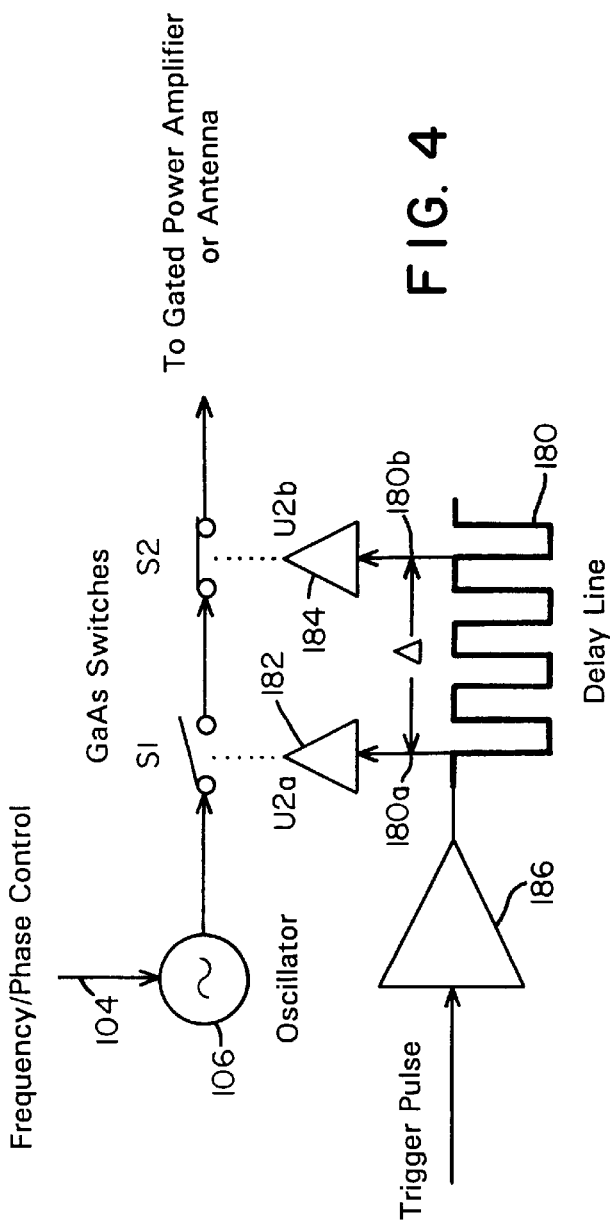
FIG. 4 shows a first embodiment of a time gating circuit using a set of high-speed switches to gate the output from an oscillator.

One embodiment of time gating circuit 120 is shown in FIG. 4, comprising high speed switches S1, S2, and a delay line. High speed switches S1, S2 are GaAs FET switches, though any suitably fast switch can be implemented. The particular GaAs FET switches used in the X-band, 10.0 GHz embodiment are commercially available from Daico, part number DSW25151. The UWB signal could alternatively be gated by a single switch so long as it is suitably fast. For instance, ECL logic might provide suitably fast control of a single GaAs switch. In such a case, the delay line 180 would be unnecessary and the UWB signal waveform would be governed by the rise and fall times of the single switch.

Tapped delay line 180 can be any suitably fast delay circuit. For instance, a delay circuit can be formed from a series of inverter gates. A delay line having sub-nanosecond delay taps was implemented for time gating circuit 120 shown in FIG. 3 by a meandering microstrip line. In this case, the circuit board dielectric constant determines the velocity of propagation of a signal through a length of conductor having predetermined dimensions. Delay line 180 might alternatively be formed by a digitally controllable delay device such as that available commercially from ANALOG DEVICES, part no. AD9501, and others having as little as 10 picosecond (ps) resolution.

In operation, a trigger pulse is sent via buffer 186 to tapped delay line 180 as shown in FIG. 4. Delay line 180 is tapped at a first tap 180a to control switch S1, and at a second tap 180b to control switch S2. When the delayed trigger pulse reaches first tap 180a, it drives buffer 182 which in turn controls switch S1 to close from an open state. Closure of switch S1 allows the output of the oscillator 106 to pass through time gating circuit 120 because switch S2 is already closed at the point in time at which switch S1 closes. After a fixed amount of delay A, while switch S1 is still closed, the trigger pulse reaches second tap 180b and drives buffer 184 which in turn controls switch S2 to open from a closed state. The trigger pulse is a level transition such that when it reaches the second gate 184, the first gate 182 continues to respond to the trigger pulse until after the UWB signal pulse passes. This opening of switch S2 disconnects the output of the oscillator 106 from the output of time gating circuit 120 and thus the output signal drops to zero at that point in time.

Figure 5:
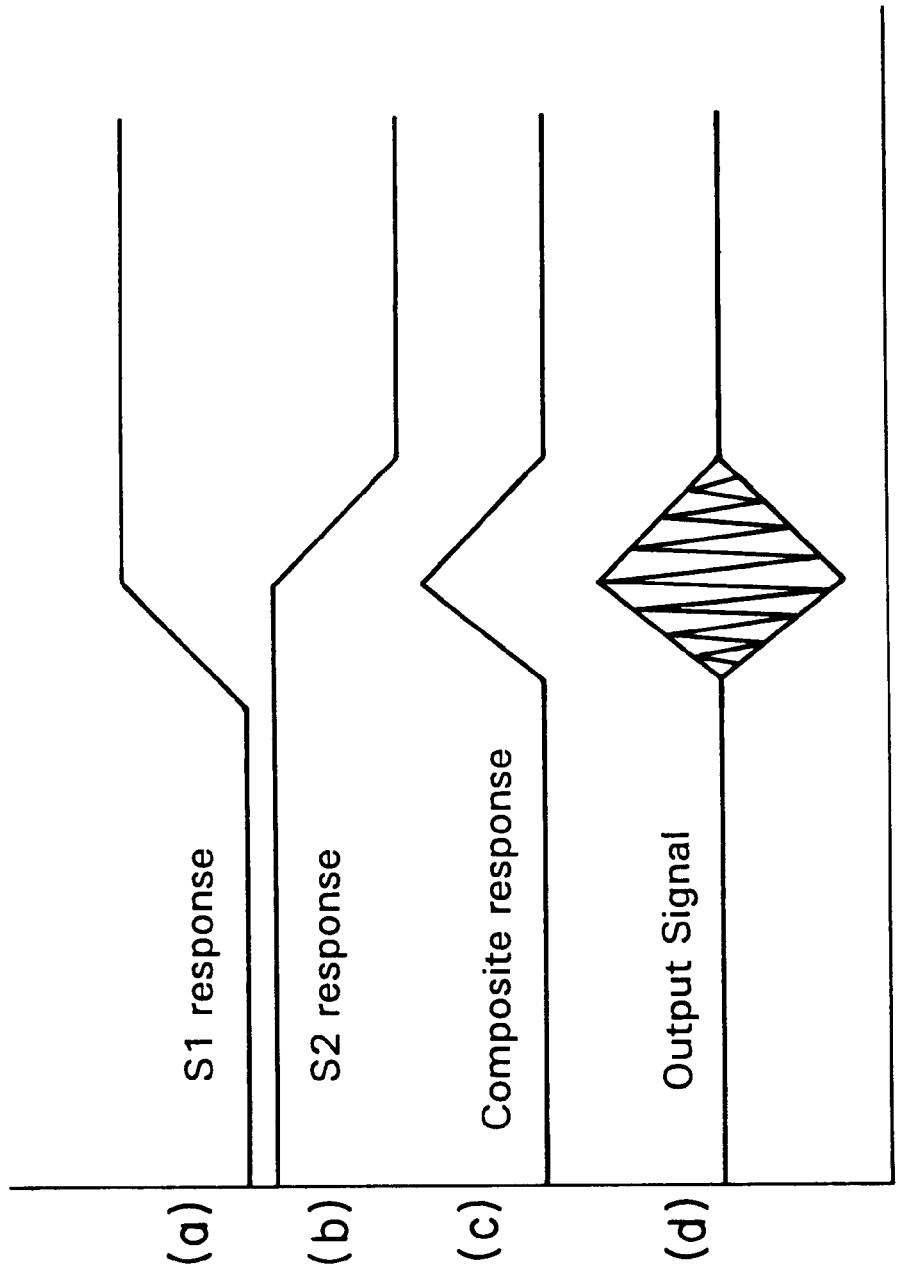
FIG. 5 depicts the response of switches S1 and S2 in FIG. 4.

FIG. 5 shows the response waveform timing of switches S1, S2. Waveform (a) depicts switch S1 being closed and thus allowing the output of oscillator 106 to pass through the time gating circuitry 120. Waveform (b) depicts switch S2 being opened and thus cutting off the output of oscillator 106. Waveform (c) shows the composite result of the response of switches S1 and S2.

Because of the finite rise times of switches S1, S2, (typically a few hundred picoseconds for GaAs switches), the time-gated oscillator UWB output pulse has an amplitude response which is essentially triangular in nature as shown in waveform (d) of FIG. 5. By adjusting the fixed amount of delay A between the operation of switch S1 and the operation of switch S2, and by selecting GaAs FET switches which have fast rise times and closely matched propagation delay times, a sub-nanosecond microwave burst can be generated having a bandwidth as great as several GHz. The shorter the burst, the greater the bandwidth.

If a programmable delay device is used to form delay line 180, the bandwidth of the UWB signal can be adjusted on a real-time basis by adjusting the delay A. In addition, by using an oscillator 106 which can be hopped in frequency, the instantaneous bandwidth and center frequency of the radiated UWB signal can be changed on a pulse-to-pulse basis.

The burst frequency waveform output from the UWB source is non-coherent on a pulse-to-pulse basis. This is acceptable for use with an UWB receiver which can respond to the instantaneous signal energy. Alternatively, the transmitted pulses can be made pulse-to-pulse coherent by deriving the times for operation of switches S1 and S2 from the oscillator frequency through a digital pre-scaler and divider. Thus, phase shift keying (PSK), or the phase component of quadrature amplitude modulation (QAM) can be implemented. Amplitude shift keying (ASK) can be implemented by the presence or absence of a pulse, or pulse position modulation (PPM) can be implemented. Any modulation scheme utilizing phase and/or amplitude can be implemented.

Figure 7A:
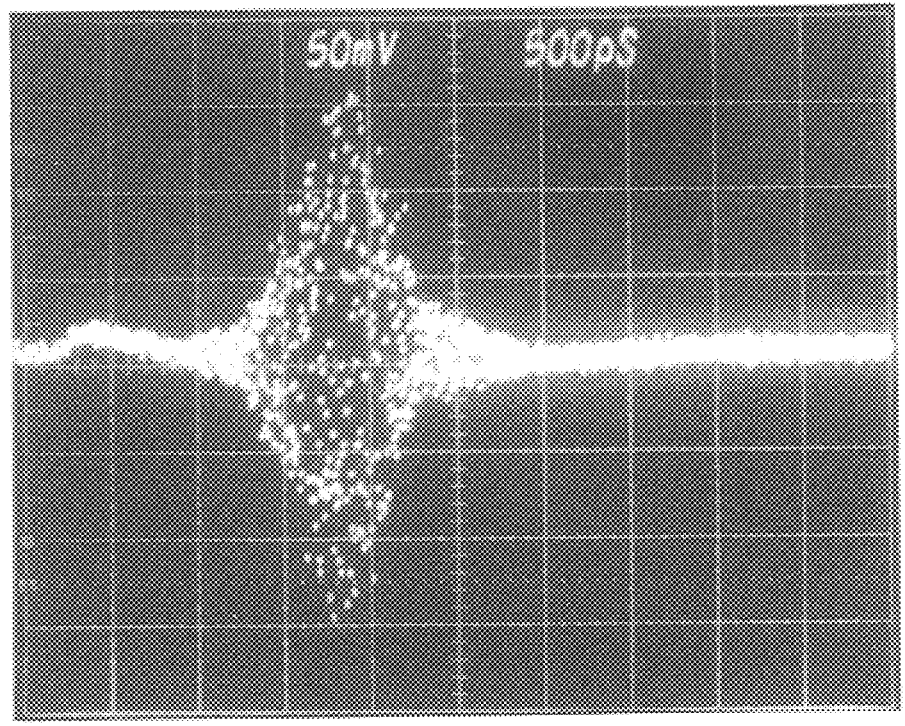
FIGS. 7A and 7B show an X-band UWB signal generated by the time-gated UWB transmitter shown in FIG. 4.

FIG. 7A shows an actual transmitted UWB signal generated by an X-band time-gated oscillator according to the embodiment shown in FIG. 4. This particular UWB signal was generated with an X-band microwave oscillator 106 comprising a 2.5 GHz VCO step recovery diode source multiplied up by four to form a 10 GHz source. A time-gating pulse of 500 picosecond (ps) duration was used. As shown in FIG. 7A, the pulse from time gating circuit 102 was approximately triangularly-shaped. The resultant X-band UWB signal had a 3 dB down bandwidth of over 2 GHz.

Figure 7B:
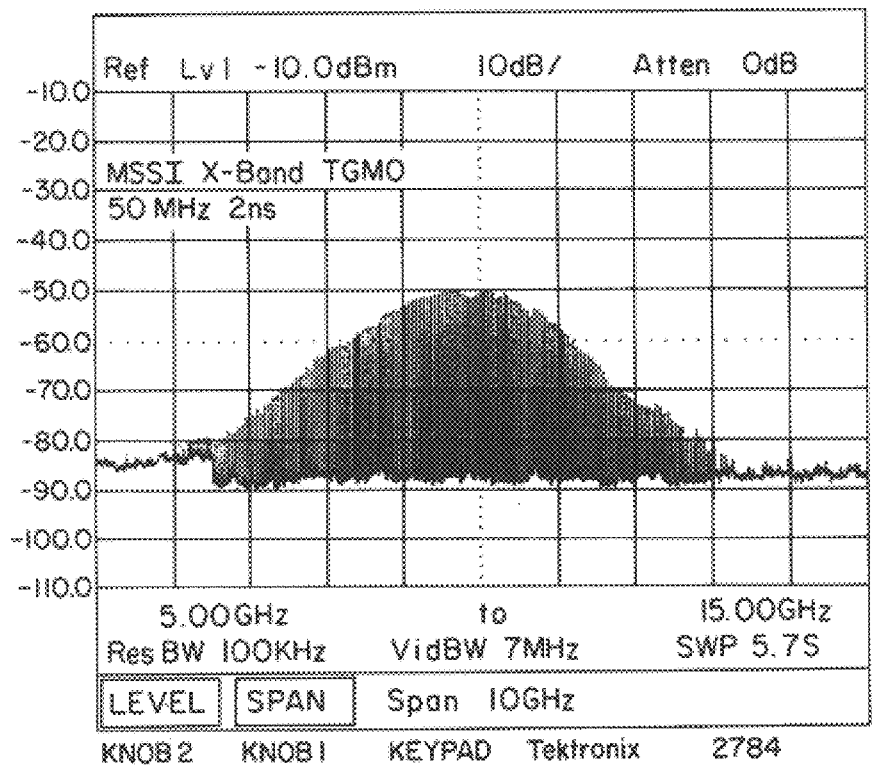

FIG. 7B shows the frequency spectrum of the UWB signal shown in FIG. 7A. Note that the shape of the frequency spectrum is affected by the shape of the response pulse in the time gating circuit 120.

Figure 6:
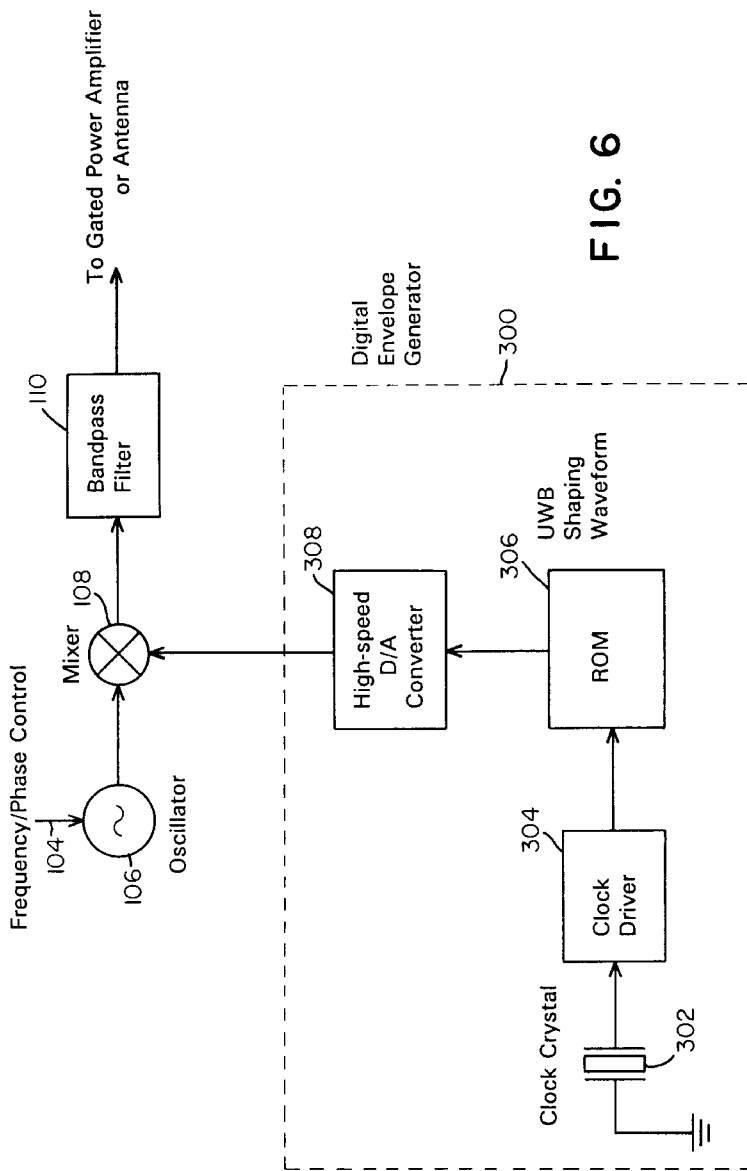
FIG. 6 shows an embodiment of a time-gated UWB transmitter using digital pulse shaping.

FIG. 6 shows an embodiment of a time-gated oscillator UWB transmitter made practical by the availability of high-speed programmable logic and D/A converters. In this embodiment, a digital envelope generator circuit 300 is used to form the time gating circuit 120.

A clock crystal 302 drives a clock driver 304 to output sequential addresses to high-speed read only memory (ROM) 306. The ROM 306 could ideally be a bank of ROMs triggered sequentially to accelerate the speed of the relatively slow memory. The speed of the data output from the bank of ROMs 306 corresponds to the speed of clock crystal 302. The data clocked out of ROM 306 is converted to an analog signal by a high-speed D/A converter 308, and thereafter input to mixer 108 as a gating pulse.

ROM 306 is programmed with the desired UWB waveform shape, and thus forms a lookup table having data which is converted from digital form to analog form by the D/A converter 308. In the real world, mixer 108 is not perfectly linear, and thus shaping the analog excitation pulse from the D/A converter 308 will shape the output UWB signal. The preferred waveform shape stored in ROM 306 is determined empirically based on a desired UWB output spectral waveform.

Digital envelope generator circuit 300 provides an analog modulation function for mixer 108, and thus AM-modulates the "carrier" signal from the oscillator 106.

While the invention has been described with reference to the exemplary preferred embodiments thereof, those skilled in the art will be able to make the various modifications to the described embodiments of the invention without departing from the true spirit and scope of the invention. For instance, the invention is applicable for use by oscillators of any frequency as appropriate to the application. Moreover, it is within the scope of the present invention to implement the analog components digitally as appropriate to the application. For instance, a suitably fast digital signal processor can replace the oscillator, low-level impulse generator, filter, delay line, switch and/or control logic. For the sake of convenient reference, the circuits and methods for altering, conditioning, adapting, filtering, pulse shaping, and/or controlling a low-level UWB pulses or impulse sources, including the setting, regulating or controlling of bandwidth, frequency, phase, multi-level attenuation/amplitude, etc., are herein referred to as waveform adapting or adaptation, or performed by a waveform adapter.

We claim:

1. A transmitter that radiates representations of ultra-wide band signals, said transmitter comprising:

a switched impulse generator to generate a series of high-speed low-level ultra-wideband pulses;

a waveform adapter responsive to said low-level ultra-wideband pulses, said waveform adapter including a filter that defines a center frequency of said low-level pulses; and an antenna responsive to said waveform adapter to radiate representations of said ultra-wideband signals.

2. The transmitter according to claim 1, wherein:

said waveform adapter further defines a bandwidth of said low-level pulses.

3. An ultra-wideband transmitter comprising a signal generator that generates an ultra-wideband signal having a selectable center frequency and bandwidth, an antenna responsive to said signal generator to radiate representations of said ultra-wideband signals, said generator comprising:

an oscillator;

a low-level impulse generator to generate a low-level impulse signal to gate an output of said oscillator;

a mixer having an RF port input receiving said output of said oscillator and having an X port input receiving an output of said low-level impulse generator; and an amplifier to amplify a signal output from said mixer to an amplified-level signal for transmission;

said amplified-level signal having a center frequency and a bandwidth based on at least one characteristic of said oscillator.

4. An ultra-wideband transmitter comprising a signal generator that generates an ultra-wideband signal having a selectable center frequency, an antenna responsive to said signal generator to radiate representations of said ultra-wideband signals, said signal generator generates an ultra-wideband signal having a selectable bandwidth and comprises:

an oscillator;

a low-level impulse generator to generate a low-level impulse signal to gate an output of said oscillator;

a filter to be impulse-excited by said low-level impulse signal;

a buffer amplifier to amplify a signal output from said filter;

a mixer having an RF port input receiving said output of said oscillator and having an X port input receiving an output of said buffer amplifier;

a bandpass filter to filter an ultra-wideband output from said mixer prior to transmission of said ultra-wideband signal; and an amplifier to amplify a signal output from said bandpass filter to an amplified-level signal for transmission;

said amplified-level signal having a center frequency and a bandwidth based on at least one characteristic of said oscillator and at least one characteristic of said filter.

5. The ultra-wideband transmitter according to claim 4, wherein said at least one characteristic of said filter is selected from a group comprising:

center frequency;

bandwidth;

out of band rejection; and skirt response.

6. The ultra-wideband transmitter according to claim 4, wherein:

said oscillator is a voltage controlled oscillator; and a frequency of said oscillator being selectable between a plurality of frequencies to effect frequency hopping of said ultra-wideband transmitter.

7. The ultra-wideband transmitter according to claim 4, wherein: power to said amplifier is gated in synchronization with timing of said signal output from said filter.

8. The ultra-wideband transmitter according to claim 4, further comprising:

a data encoder adapted and arranged to encode data in said ultra-wideband signal.

9. The ultra-wideband transmitter according to claim 8, wherein:

said data is encoded at a rate in excess of 100 megabits per second.

10. An ultra-wideband transmitter comprising a signal generator that generates an ultra-wideband signal having a selectable center frequency and bandwidth, an antenna responsive to said signal generator to radiate representations of said ultra-wideband signals, said signal generator comprising:

an oscillator;

a low-level impulse generator to generate a low-level impulse signal to gate an output of said oscillator;

a voltage-controlled buffer amplifier to amplify a signal output from said low-level impulse generator;

a mixer having an RF port input receiving said output of said oscillator and having an X port input receiving an output of said buffer amplifier;

a bandpass filter to filter an ultra-wideband output from said mixer prior to transmission of said ultra-wideband signal; and an amplifier to amplify a signal output from said bandpass filter to an amplified-level signal for transmission;

said amplified-level signal having a center frequency based on at least one characteristic of said oscillator and having a bandwidth based on at least one characteristic of said low-level impulse signal and a control voltage to said voltage-controlled buffer amplifier.

11. The ultra-wideband transmitter according to claim 10, wherein:

power to said amplifier is gated corresponding to a timing of said signal output from said filter.

12. The ultra-wideband transmitter according to claim 10, wherein:

said oscillator is a voltage controlled oscillator; and said frequency of said oscillator being selectable between a plurality of frequencies to effect frequency hopping of said ultra-wideband transmitter.

13. The ultra-wideband transmitter according to claim 10, wherein:

power to said amplifier is gated according to timing of said signal output from said filter.

14. The ultra-wideband transmitter according to claim 10, further comprising:

a data encoder adapted and arranged to encode data in said ultra-wideband signal.

15. The ultra-wideband transmitter according to claim 14, wherein:

said data is encoded at a rate in excess of 100 megabits per second.

16. A transmitter that radiates representations of ultra-wide band signals comprising:

an oscillator to generate a low-level signal;

a time gate to gate a several nanosecond to sub-nanosecond range time portion of an output of said oscillator thereby to produce low-level time-gated ultra-wide band signal;

said time-gated ultra-wide band signal having a center frequency corresponding to a frequency of said oscillator;

an amplifier responsive to said time-gated ultra-wide band signal to produce an amplified output; and an antenna responsive to said amplified output to radiate representations of said ultra-wide band signals.

17. The transmitter according to claim 16, wherein said time gate comprises:

a a pair of serially connected successively fired on-off and off-on transistor switches to gate said small time portion of said output of said oscillator.

18. The transmitter according to claim 16, wherein:

said time-gated ultra-wide band signal has a bandwidth based on a pulse width of said gated time portion of said output of said oscillator.

19. The transmitter according to claim 18, wherein:

said bandwidth of said time-gated ultra-wideband signal is inversely proportional to said pulse width of said gated time portion of said output of said oscillator.

20. The transmitter according to claim 16, wherein:

said oscillator comprises a voltage controlled oscillator; and said frequency of said oscillator is alterable between a plurality of frequencies to effect frequency hopping of said ultra-wideband transmitter.

21. The transmitter according to claim 16, wherein:

power to said amplifier is gated corresponding to a timing of said gated small time portion of said time-gated ultra-wideband signal.

22. The transmitter according to claim 16, further comprising:
a data encoder adapted and arranged to encode data in said time-gated ultra-wideband signal.

23. The ultra-wideband transmitter according to claim 22, wherein:
said data is encoded at a rate in excess of 100 megabits per second.

24. A method of radiating representations of an ultra-wideband signal having a desired center frequency, said method comprising:
generating a low-level signal having a frequency corresponding to a desired center frequency of said ultra-wideband signal;
impulse-gating said low-level signal to generate a series of discrete ultra-wideband pulses, said impulse-gating being less than about 5 nanoseconds;
waveform adapting said discrete pulses to produce a waveform-adapted output; and
applying said waveform-adapted output to an antenna to radiate representations of ultra-wide band signals.

25. The method of generating an ultra-wideband signal according to claim 24, wherein:
said low-level impulse-gating is less than 1 nanosecond.

26. The method of generating an ultra- wideband signal having a center frequency according to claim 24, further comprising:
after said impulse-gating step, amplifying said ultra-wideband pulses to a desired power level; and
radiating said amplified pulses at said center frequency.

27. The method of generating an ultra-wideband signal having a center frequency according to claim 24, further comprising:
adjusting on a pulse-by-pulse basis said frequency of said signal.

28. A method of generating an ultra-wideband signal having a center frequency, comprising:
generating a source signal having a frequency corresponding to a desired center frequency of said ultra-wideband signal;
time-gating said source signal to generate a series of discrete pulses, said time-gating being less than about 5 nanoseconds;
waveform adapting said series of discrete pulses to produce a waveform-adapted output whose frequency or bandwidth is determined by at least one of filtering, mixing, multi-level attenuating, and pulse-shaping said source signal; and
applying said waveform-adapted output to an antenna.

29. The method of generating an ultra-wideband signal according to claim 28, wherein:
said time-gating is less than 1 nanosecond.

30. The method of generating an ultra- wideband signal having a center frequency according to claim 28, further comprising:
amplifying said ultra-wideband signal to produce an amplified ultra-wideband signal of a desired power level; and
radiating said amplified ultra-wideband signal at said center frequency.

31. A signaling device including transmitter, said signaling device comprising:
a switched impulse generator to generate a series of discrete low-level ultra-wideband pulses
a waveform adapter responsive to said low-level ultra-wideband pulses that defines a center frequency and bandwidth of said ultra-wide band pulses;
said center frequency being determined by one of frequency-mixing and filtering said ultra-wide band signal; and
an antenna responsive to said waveform adapter to radiate a representation of said ultra-wideband signal.

32. A method for transmitting data using ultra-wideband techniques, said method comprising:
generating a series of UWB signal pulses by using one of an UWB impulse generator and a pulse-excited oscillator;
providing a data encoder to modulate said series of UWB signal pulses;
providing a waveform adapter to modulate said series of signal pulses with said data encoder wherein said modulating comprises at least one of inter-pulse frequency variation, inter-pulse phase shifting and multi-level attenuation according to representations of data, said modulating being achieved by waveform adapting said signal pulses by controlling one of phase, bandwidth, frequency, amplitude, and attenuation;
applying said modulated signal pulses to an antenna; and
transmitting said modulated pulses at a selectable center frequency.

33. An ultra-wideband transmitter comprising:
a signal generator to generate an ultra-wideband signal having a selectable center frequency, said signal generator comprising:
a low-level impulse generator to generate a low-level impulse signal,
a filter to be impulse-excited by said low-level impulse signal, and
an amplifier to amplify a signal output from said filter to an amplified-level signal for transmission, a center frequency and a bandwidth of said amplified-level signal being selectable based on at least one characteristic of said filter; and
an antenna responsive to said signal generator to radiate representations of said ultra-wideband signals.

34. The ultra-wideband transmitter according to claim 33, wherein:
power to said amplifier is gated corresponding to a timing of said signal output from said filter.

* * * * *